No. 736,073. PATENTED AUG. 11, 1903.
D. F. COLLICUTT.
LEVEL AND PLUMB.
APPLICATION FILED OCT. 27, 1902.

NO MODEL.

Witnesses
Louis D. Heinrichs
L. H. Monson

Inventor
Daniel F. Collicutt
By his Attorney

No. 736,073. Patented August 11, 1903.

UNITED STATES PATENT OFFICE.

DANIEL F. COLLICUTT, OF COLUMBIA, SOUTH CAROLINA.

LEVEL AND PLUMB.

SPECIFICATION forming part of Letters Patent No. 736,073, dated August 11, 1903.

Application filed October 27, 1902. Serial No. 128,881. (No model.)

*To all whom it may concern:*

Be it known that I, DANIEL F. COLLICUTT, a citizen of the United States, residing at Columbia, county of Richland, and State of South Carolina, have invented a certain new and useful Improvement in Levels and Plumbs, of which the following is a specification.

My invention relates to a new and useful improvement in plumbs and levels, and has for its object to provide a device of this description which carries a dial or dials divided into three hundred and sixty degrees and weighted pointer or pointers adapted to travel over the face of the dial to indicate the angle of the surface against which the level and plumb is held.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
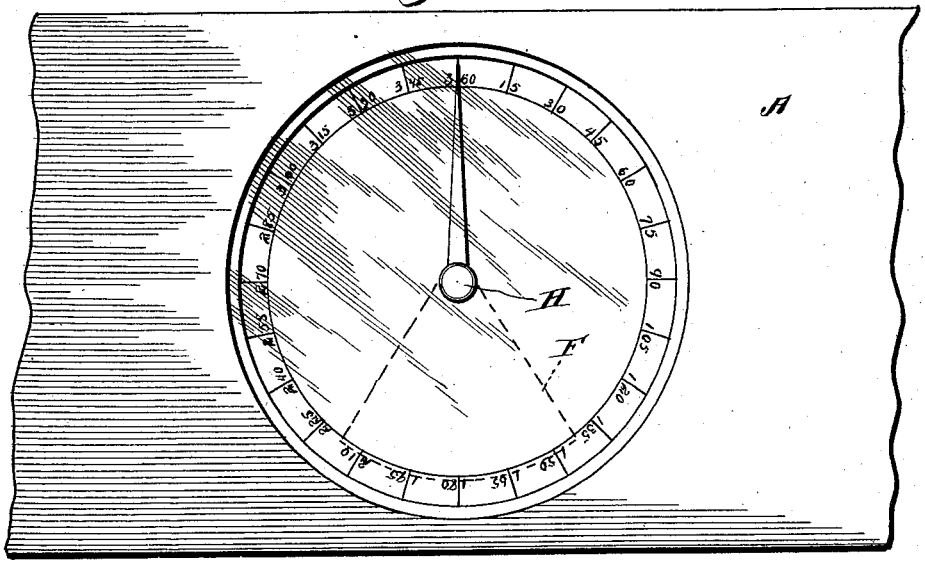
Figure 2:
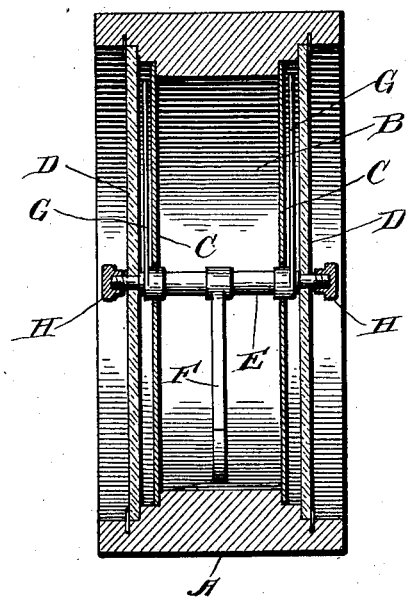

Figure 1 is a side elevation of a portion of the level and plumb; Fig. 2, a cross-section through the same.

A represents the body of the level and plumb, which consists of the usual block having parallel straight edges. Through this body is formed, preferably at the center of the level and plumb, a circular opening B, in which are arranged dials C, having graduations marked upon the face near the periphery of the same, representing three hundred and sixty degrees. Upon the outside of the dials and a little distance therefrom are arranged glass disks D for the purpose of protecting the dials. E is an arbor journaled in the center of each glass disk and within the opening B, and in the center of the arbor E and secured to said arbor is a weight F. Secured rigidly to the arbor, near each end thereof and interposed between the dials C and the glass disks D, are the pointers or indicating-hands G. As these hands G extend from the arbor exactly opposite to the weight F, it will be seen that the weight will always cause the pointers G to point upward, so that if the surface upon which the level and plumb is held is not exactly level or plumb the pointer-hands will indicate the angle of said surface.

For the purpose of stopping the vibrations or oscillations of the pointers G so as to correctly read the indicator various means might be employed, but probably the most practical means are those shown in the drawings, which consist in extending the ends of the arbor E through the glass disks and providing these ends with small buttons H, which may be pressed by the fingers to cause the oscillation of the pointers to cease. Other means to accomplish this could be used, such as journaling the arbor so that a frictional spring will be interposed between the arbor and the bearing, so as to cause sufficient friction to arrest the oscillations of the pointer-hands, but not to cause any inaccuracy of the indicator.

While I have shown the level and plumb provided with a double dial, it is obvious that a single dial could be used, in which case the opening B would not be formed entirely through the body, but would only consist of a recess in one side of the same, and instead of journaling the arbor in the glass disks the arbor could be journaled independent of the glass disks by a bearing arising from the body of the level or plumb. Therefore I do not wish to be limited to the exact construction here shown, as slight modifications could be made without departing from the spirit of my invention.

Having thus fully described my invention, what I claim as new and useful is—

1. In a level and plumb, a body having parallel edges and a circular opening formed through the body, an arbor arranged in the center of said opening, a weight secured to the arbor and arranged within the opening, dials secured to the body provided with central openings through which the arbor projects, pointers carried by the arbor outside of the dials, glass disks secured to the body outside of the pointers, said glass disks being provided with central bearings for the arbor, and means adapted to be operated outside of the glass disks for arresting the oscillations of the pointers, as and for the purpose specified.

2. In combination in a level and plumb, a body provided with parallel edges, said body provided with an opening formed transversely through the same, dials arranged within the opening and secured to the body, said dials provided with a circle of graduations representing three hundred and sixty degrees, glass disks arranged within the opening and secured to the body at a slight distance upon the outside of the dials, an arbor extending transversely across the body and arranged in the center of the opening and journaled in the glass disks and extending therethrough, a weight secured to the arbor between the dials, pointer-hands secured to the arbor and arranged between the dials and the glass disks, and buttons secured upon the outer end of the arbor, as and for the purpose specified.

In testimony whereof I have hereunto affixed my signature in the presence of two subscribing witnesses.

DANIEL F. COLLICUTT.

Witnesses:
 P. O. ROBERTS,
 A. F. BROOKER.